US012311260B2

(12) United States Patent
Lu et al.

(10) Patent No.: US 12,311,260 B2
(45) Date of Patent: May 27, 2025

(54) METHOD AND APPARATUS FOR DISPLAYING VIRTUAL SCENE, TERMINAL, AND STORAGE MEDIUM

(71) Applicant: TENCENT TECHNOLOGY (SHENZHEN) COMPANY LIMITED, Shenzhen (CN)

(72) Inventors: Qingchun Lu, Shenzhen (CN); Jiang Yan, Shenzhen (CN); Jiacheng Wei, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 456 days.

(21) Appl. No.: 17/747,878

(22) Filed: May 18, 2022

(65) Prior Publication Data
US 2022/0274017 A1    Sep. 1, 2022

Related U.S. Application Data

(63) Continuation of application No. PCT/CN2021/122650, filed on Oct. 8, 2021.

(30) Foreign Application Priority Data

Nov. 13, 2020    (CN) .......................... 202011268280.6

(51) Int. Cl.
A63F 13/5258    (2014.01)
A63F 13/56      (2014.01)

(52) U.S. Cl.
CPC .......... *A63F 13/5258* (2014.09); *A63F 13/56* (2014.09); *A63F 2300/6684* (2013.01)

(58) Field of Classification Search
CPC ...... A63F 13/52; A63F 13/56; A63F 13/5258; A63F 13/5372
See application file for complete search history.

(56) References Cited

U.S. PATENT DOCUMENTS

2015/0018062 A1*  1/2015  Montano ............. G07F 17/3267
                                                       463/13
2018/0028918 A1   2/2018  Tang et al.
(Continued)

FOREIGN PATENT DOCUMENTS

CN    107050862 A    8/2017
CN    109675307 A    4/2019
(Continued)

OTHER PUBLICATIONS

Taiwan Intellectual Property Office Examination report for Application No. 11121076600 Nov. 1, 2022 10 pages.
(Continued)

*Primary Examiner* — James S. McClellan
(74) *Attorney, Agent, or Firm* — ANOVA LAW GROUP, PLLC

(57) ABSTRACT

A method for displaying a virtual scene, includes: displaying a virtual scene image on a terminal screen, the virtual scene image including a controlled virtual object in a virtual scene, the controlled virtual object being a virtual object currently controlled by a terminal; and displaying the controlled virtual object at a target position of the terminal screen when the controlled virtual object belongs to a first camp, the first camp being a camp located at the upper right of the virtual scene, the target position being shifted to an upper right position relative to a central position of the terminal screen.

20 Claims, 10 Drawing Sheets

(56) References Cited

U.S. PATENT DOCUMENTS

| | | | |
|---|---|---|---|
| 2019/0070493 A1 | 3/2019 | He | |
| 2021/0362042 A1 | 11/2021 | Shao et al. | |
| 2022/0023761 A1 | 1/2022 | Li et al. | |
| 2022/0051470 A1 | 2/2022 | Wei et al. | |
| 2022/0365634 A1* | 11/2022 | Lu | A63F 13/5378 |
| 2024/0198221 A1* | 6/2024 | Li | A63F 13/5372 |

FOREIGN PATENT DOCUMENTS

| | | |
|---|---|---|
| CN | 110339554 A | 10/2019 |
| CN | 111481934 A | 8/2020 |
| CN | 111589133 A | 8/2020 |
| CN | 111589142 A | 8/2020 |
| CN | 111603770 A | 9/2020 |
| CN | 112245920 A | 1/2021 |
| JP | H11146979 A | 6/1999 |

OTHER PUBLICATIONS

The Japan Patent Office (JPO) Notification of Reasons for Refusal for Application No. 2022-568479 and Translation Dec. 4, 2023 6 Pages.

China National Intellectual Property Administration (CNIPA) Office Action 1 for 202011268280.6 Nov. 11, 2021 12 Pages (including translation).

The World Intellectual Property Organization (WIPO) International Search Report for PCT/CN2021/122650 Jan. 6, 2022 8 Pages (including translation).

CHER1Y, "How to restrain the first-level group of the hook hero (from the perspective of the red side)," bilibili.com, Jan. 27, 2020, Retrieved from the Internet:URL: https://www.bilibili.com/video/BV137411r7y6. 3 pages.

\* cited by examiner

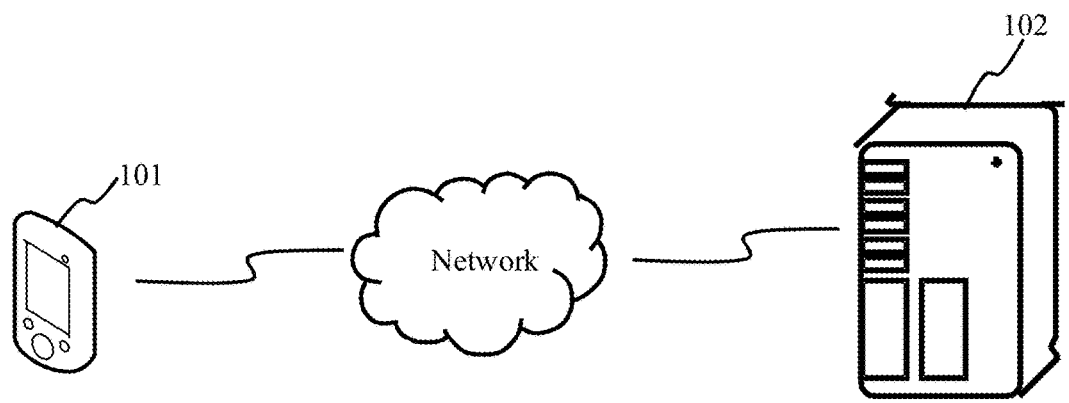

FIG. 1

```
┌─────────────────────────────────────────────────────────────┐        ┌── 201
│ A terminal displays a virtual scene image on a terminal    │       /
│ screen, the virtual scene image including a controlled     │──────
│ virtual object in a virtual scene, the controlled virtual  │
│ object being a virtual object currently controlled by the  │
│                        terminal                             │
└─────────────────────────────────────────────────────────────┘
                              │
                              ▼
┌─────────────────────────────────────────────────────────────┐        ┌── 202
│ The terminal displays the controlled virtual object at a   │       /
│ target position of the terminal screen when the controlled │──────
│ virtual object belongs to a first camp, the first camp     │
│ being a camp located at the upper right of the virtual     │
│ scene, the target position being shifted to an upper right │
│ position relative to a central position of the terminal    │
│                         screen                              │
└─────────────────────────────────────────────────────────────┘
```

FIG. 2

METHOD AND APPARATUS FOR DISPLAYING VIRTUAL SCENE, TERMINAL, AND STORAGE MEDIUM

CROSS-REFERENCES TO RELATED APPLICATIONS

The present disclosure is a continuation application of PCT Patent Application No. PCT/CN2021/122650, filed on Oct. 8, 2021, which claims priority to Chinese Patent Application No. 202011268280.6, filed on Nov. 13, 2020 and entitled "METHOD AND APPARATUS FOR DISPLAYING VIRTUAL SCENE, TERMINAL, AND STORAGE MEDIUM", the entire contents of both of which are incorporated herein by reference.

FIELD OF THE TECHNOLOGY

The present disclosure relates to the field of multimedia technologies, and in particular, to a method and an apparatus for displaying a virtual scene, a terminal, and a storage medium.

BACKGROUND OF THE DISCLOSURE

MOBA (Multiplayer Online Battle Arena) game is a competitive team game, including a first camp at the upper right of a virtual scene and a second camp at the lower left of the virtual scene. With the development of terminal technology, MOBA games run on terminals have gradually become important terminal games. However, for a user who controls a virtual object belonging to the first camp, a virtual object belonging to the second camp will appear at the lower left of a screen, and operation controls on the terminal screen will block a lower left field of view of the user, thereby affecting gaming experience of the user.

SUMMARY

Embodiments of the present disclosure provide a method and an apparatus for displaying a virtual scene, a terminal, and a storage medium. A controlled virtual object is displayed at an upper right position relative to a center of a terminal screen, so that operation controls on the terminal screen do not block a lower left field of vision of a user, and the user will not wrongly judge his or her position, thereby improving human-computer interaction efficiency, and enhancing gaming experience of the user. The technical solutions are as follows:

According to an aspect, a method for displaying a virtual scene is provided. The method is performed by a terminal and includes: displaying a virtual scene image on a terminal screen, the virtual scene image including a controlled virtual object in a virtual scene, the controlled virtual object being a virtual object currently controlled by the terminal; and displaying the controlled virtual object at a target position of the terminal screen when the controlled virtual object belongs to a first camp, the first camp being a camp located at the upper right of the virtual scene, the target position being shifted to an upper right position relative to a central position of the terminal screen.

According to an aspect, an apparatus for displaying a virtual scene is provided, including: a first display module, configured to display a virtual scene image on a terminal screen, the virtual scene image including a controlled virtual object in a virtual scene, the controlled virtual object being a virtual object currently controlled by a terminal; a second display module, configured to display the controlled virtual object at a target position of the terminal screen when the controlled virtual object belongs to a first camp, the first camp being a camp located at the upper right of the virtual scene, the target position being shifted to an upper right position relative to a central position of the terminal screen.

According to an aspect, a terminal is provided. The terminal includes a processor and a memory, the memory being configured to store at least one computer program, the at least one computer program being loaded and executed by the processor to implement the following operations: displaying a virtual scene image on a terminal screen, the virtual scene image including a controlled virtual object in a virtual scene, the controlled virtual object being a virtual object currently controlled by a terminal; and displaying the controlled virtual object at a target position of the terminal screen when the controlled virtual object belongs to a first camp, the first camp being a camp located at the upper right of the virtual scene, the target position being shifted to an upper right position relative to a central position of the terminal screen.

According to an aspect, a non-transitory computer-readable storage medium is provided, the computer-readable storage medium storing at least one computer program, the at least one computer program being loaded and executed by the processor to implement the following operations: displaying a virtual scene image on a terminal screen, the virtual scene image including a controlled virtual object in a virtual scene, the controlled virtual object being a virtual object currently controlled by a terminal; and displaying the controlled virtual object at a target position of the terminal screen when the controlled virtual object belongs to a first camp, the first camp being a camp located at the upper right of the virtual scene, the target position being shifted to an upper right position relative to a central position of the terminal screen.

BRIEF DESCRIPTION OF THE DRAWINGS

To describe the technical solutions in the embodiments of the present disclosure more clearly, the following briefly introduces the accompanying drawings required for describing the embodiments. Apparently, the accompanying drawings in the following description show only some embodiments of the present disclosure, and a person of ordinary skill in the art may still derive other accompanying drawings from these accompanying drawings without creative efforts.

FIG. 1 is a schematic diagram of an implementation environment of a method for displaying a virtual scene according to an embodiment of the present disclosure.

FIG. 2 is a flowchart of a method for displaying a virtual scene according to an embodiment of the present disclosure.

DESCRIPTION OF EMBODIMENTS

Figure 3:
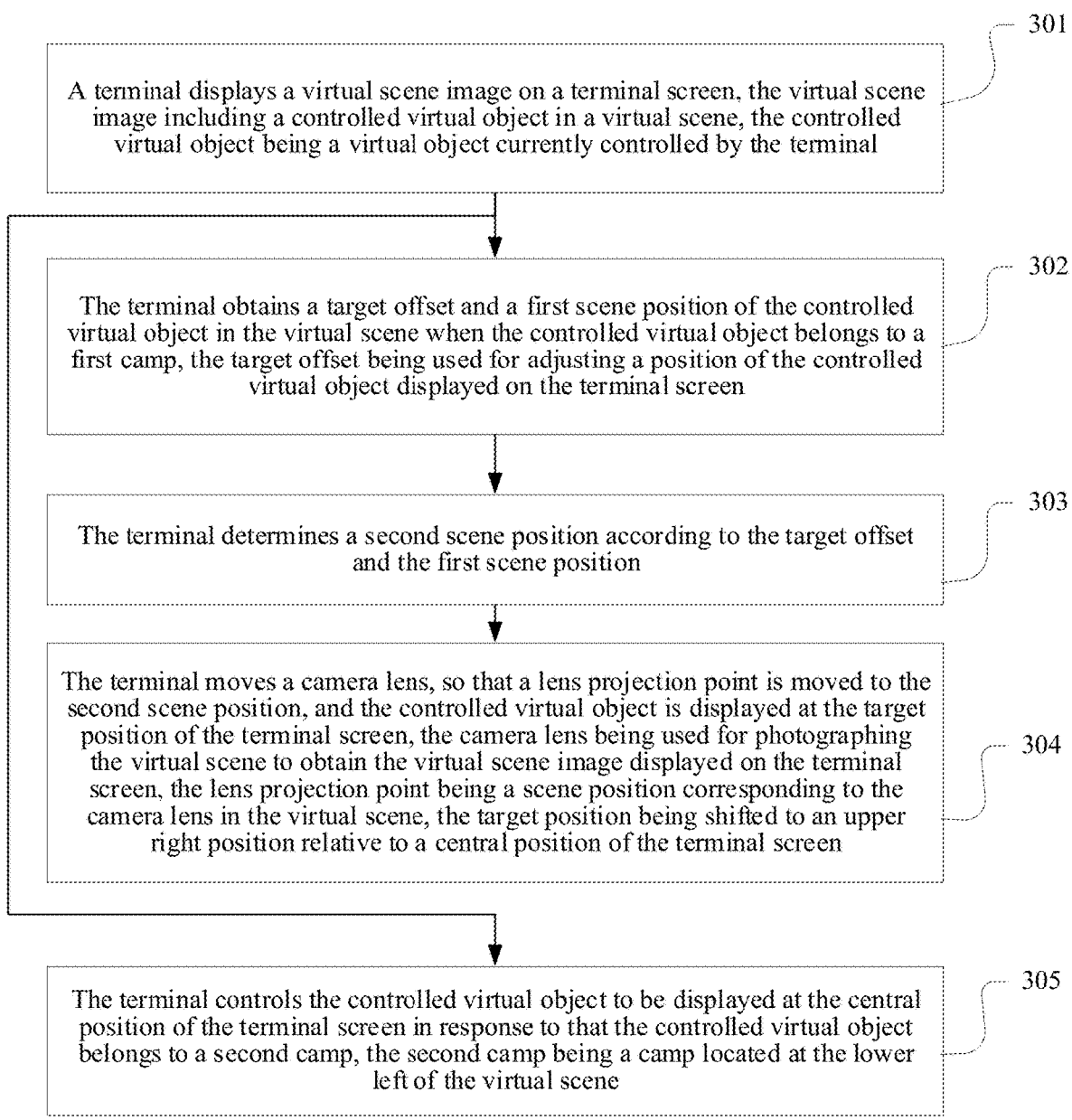
FIG. 3 is another flowchart of a method for displaying a virtual scene according to an embodiment of the present disclosure.

To make the objectives, technical solutions, and advantages of the present disclosure clearer, the following further describes the implementations of the present disclosure in detail with reference to the accompanying drawings.

In the present disclosure, "at least one" means one or more, and "a plurality of" means two or more. For example, "a plurality of virtual objects" means two or more virtual objects.

Some terms described in the embodiments of the present disclosure are explained as follows:

Virtual scene: a virtual scene displayed (or provided) when an application program is run on a terminal. The virtual scene is a simulated environment of a real world, or a semi-simulated semi-fictional virtual environment, or an entirely fictional virtual environment. The virtual scene is any one of a two-dimensional virtual scene, a 2.5-dimensional virtual scene, or a three-dimensional virtual scene, and the dimension of the virtual scene is not limited in the embodiments of the present disclosure. For example, the virtual scene includes the sky, the land, the ocean, or the like. The land includes environmental elements such as the desert and a city. The terminal user can control the virtual object to move in the virtual scene. In some embodiments, the virtual scene can be further used for a virtual scene battle between at least two virtual objects, and there are virtual resources available to the at least two virtual objects in the virtual scene. In some embodiments, the virtual scene includes two symmetric regions, virtual objects belonging to two hostile camps respectively occupy one of the regions, and a goal of each side is to destroy a target building/fort/base/crystal deep in the opponent region to win the victory. For example, the symmetric regions are a lower left region and an upper right region, or a middle left region and a middle right region. In some embodiments, an initial position of a camp in a MOBA game, that is, a birth position of a virtual object belonging to the camp, is at the lower left of the virtual scene, while the initial position of the other camp is at the upper right of the virtual scene.

Virtual object: a movable object in a virtual scene. The movable object is a virtual character, a virtual animal, a cartoon character, or the like, for example, a character, an animal, a plant, an oil drum, a wall, or a stone displayed in a virtual scene. The virtual object can be a virtual image used for representing a user in the virtual scene. The virtual scene may include a plurality of virtual objects; each virtual object has a shape and a volume in the virtual scene, and occupies some space in the virtual scene. In some embodiments, when the virtual scene is a three-dimensional virtual scene, the virtual object can be a three-dimensional model. The three-dimensional model can be a three-dimensional character constructed based on a three-dimensional human skeleton technology, or the same virtual object can show different appearances by wearing different skins. In some embodiments, the virtual object can be alternatively implemented by using a 2.5-dimensional model or a two-dimensional model. This is not limited in the embodiments of the present disclosure.

In some embodiments, the virtual object is a player character controlled through an operation on a client, or an artificial intelligence (AI) character set in a virtual scene battle through training, or a non-player character (NPC) set in a virtual scene interaction. In some embodiments, the virtual object is a virtual character for performing adversarial interaction in a virtual scene. In some embodiments, a quantity of virtual objects participating in the interaction in the virtual scene may be preset, or may be dynamically determined according to a quantity of clients participating in the interaction.

A MOBA game is a game in which several forts are provided in a virtual scene, and users on different camps control virtual objects to battle in the virtual scene, occupy forts or destroy forts of the hostile camp. For example, a MOBA game may divide users into at least two hostile camps, and different virtual teams on the at least two hostile camps occupy respective map regions, and compete against each other with specific victory conditions as goals. The victory conditions include, but are not limited to, at least one of the following: occupying forts or destroy forts of the hostile camps, killing virtual objects in the hostile camps, ensuring own survivals in a specified scenario and time, seizing a specific resource, and outscoring the opponent within a specified time. For example, in a mobile MOBA game, the users may be divided into two hostile camps. The virtual objects controlled by the users are scattered in the virtual scene to compete against each other, and the victory condition is to destroy or occupy all enemy forts.

In some embodiments, each virtual team includes one or more virtual objects, such as 1, 2, 3, or 5. According to a quantity of virtual objects in each team participating in the battle arena, the battle arena is divided into 1V1 competition, 2V2 competition, 3V3 competition, 5V5 competition, and the like. 1V1 means "1 vs. 1", and details are not described herein.

In some embodiments, the MOBA game takes place in rounds (or turns), and each round of the battle arena has the same map or different maps. A duration of one round of the MOBA game is from a moment at which the game starts to a movement at which the victory condition is met.

In the MOBA games, users can control the virtual objects to cast skills to fight with other virtual objects. For example, the skill types of the skills include an attack skill, a defense skill, a healing skill, an auxiliary skill, a beheading skill, and the like. Each virtual object has one or more fixed skills, and different virtual objects generally have different skills, and different skills can produce different effects. For example, if an attack skill cast by a virtual object hits a hostile virtual object, certain damage is caused to the hostile virtual object, which is generally shown as deducting a part of virtual hit points of the hostile virtual object. In another example, if a healing skill cast by a virtual object hits a friendly virtual object, a certain healing is produced for the friendly virtual object, which is generally shown as restoring a part of virtual hit points of the friendly virtual object, and all other types of skills can produce corresponding effects. Details are not described herein again.

In the related art, usually at the beginning of a game, for a user who controls a virtual object belonging to a first camp, a virtual scene is centrally rotated, so that the first camp is located at lower left of the virtual scene, and a virtual object belonging to a second camp appears at the upper right of a screen. Because operation controls do not block view of the upper right, gaming experience of the user is improved.

The problem in the related art is that because the virtual scene of the MOBA game is not completely symmetrical, for example, virtual resources included in an upper half part and a lower half part are different, centrally rotating the virtual scene will lead to the user who controls the virtual object belonging to the first camp wrongly judges a position where the user is located, causing low efficiency in human-computer interaction.

The following describes an implementation environment of a method for displaying a virtual scene according to an embodiment of the present disclosure. FIG. 1 is a schematic diagram of an implementation environment of a method for displaying a virtual scene according to an embodiment of the present disclosure. Referring to FIG. 1, the implementation environment includes a terminal 101 and a server 102.

The terminal 101 and the server 102 can be directly or indirectly connected in a wired or wireless communication manner. This is not limited in the present disclosure.

In some embodiments, the terminal 101 is a smartphone, a tablet computer, a notebook computer, a desktop computer, a smartwatch, or the like, but is not limited thereto. An application supporting a virtual scene is installed and run on the terminal 101. The application is any one of a first-person shooting game (FPS) game, a third-person shooting game, a MOBA game, a virtual reality application, a three-dimensional map program, a military simulation program, or a multiplayer gunfight survival game. In some embodiments, the terminal 101 is a terminal used by a user, and the user uses the terminal 101 to operate a virtual object in the virtual scene to perform a movement. The movement includes, but is not limited to, at least one of body posture adjustment, crawling, walking, running, cycling, jumping, driving, picking-up, shooting, attacking, and throwing. In some embodiments, the virtual object is a virtual character, such as a simulated character role or a cartoon character role.

In some embodiments, the server 102 may be an independent physical server, or may be a server cluster or a distributed system formed by a plurality of physical servers, or may be a cloud server that provides a basic cloud computing service such as a cloud service, a cloud database, cloud computing, a cloud function, cloud storage, a network service, cloud communication, a middleware service, a domain name service, a security service, a content delivery network (CDN), big data, and an artificial intelligence platform. The server 102 is configured to provide a backend service for an application program supporting a virtual scene. In some embodiments, the server 102 is responsible for primary computing work, and the terminal 101 is responsible for secondary computing work; or the server 102 is in charge of secondary computing work, and the terminal 101 is in charge of primary computing; or a distributed computing architecture is adopted between the server 102 and the terminal 101 to perform collaborative computing.

In some embodiments, the controlled virtual object controlled by the terminal 101 (hereinafter referred to as the controlled virtual object) and other virtual objects controlled by other terminals 101 (hereinafter referred to as other virtual objects) are in the same virtual scene. In this case, the controlled virtual object interacts with other virtual objects in an adversarial manner in the virtual scene. In some embodiments, the controlled virtual objects and other virtual objects are in a hostile relationship. For example, the controlled virtual object and other virtual objects belong to different teams and organizations. The virtual objects in the hostile relationship interact against each other in the adversarial manner by casting skills. In some other embodiments, the controlled virtual object and other virtual objects are teammates. For example, a target virtual character and other virtual characters may belong to the same team, the same organization, have a friend relationship, or have temporary communication permissions. In this case, the controlled virtual object cast a treatment skill to other virtual objects.

A person skilled in the art learns that there may be more or fewer terminals. For example, there is only one terminal, or there are dozens of or hundreds of terminals or more. The quantity and the device type of the terminal are not limited in the embodiments of the present disclosure.

In some embodiments, a standard communication technology and/or protocol is used for the wireless network or the wired network described above. The network is usually the Internet, but can alternatively be any other network, including but not limited to, a local area network (LAN), a metropolitan area network (MAN), a wide area network (WAN), or any combination of a mobile, wired, or wireless network, a dedicated network, or a virtual dedicated network. In some embodiments, technologies and/or formats, such as the HyperText Markup Language (HTML) and the Extensible Markup Language (XML), are used for representing data exchanged through the network. In addition, all or some links can be encrypted by using conventional encryption technologies such as a secure socket layer (SSL), transport layer security (TLS), a virtual private network (VPN), and internet protocol security (IPsec). In some other embodiments, customized and/or dedicated data communication technologies can alternatively be used in place of or in addition to the foregoing data communication technologies.

FIG. 2 is a flowchart of a method for displaying a virtual scene according to an embodiment of the present disclosure. As shown in FIG. 2, in this embodiment of the present disclosure, an example of executing by the terminal is used for describing. The method for displaying a virtual scene includes the following steps:

201: The terminal displays a virtual scene image on a terminal screen, the virtual scene image including a controlled virtual object in a virtual scene, the controlled virtual object being a virtual object currently controlled by the terminal.

In this embodiment of the present disclosure, the terminal can display the virtual scene image on the terminal screen, the virtual scene image being obtained by photographing the virtual scene by a virtual camera through a camera lens. A position where the camera lens of the virtual camera is projected in the virtual scene is a central position of the virtual scene image. In the related art, a position where the controlled virtual object is located in the virtual scene is the central position of the virtual scene image. Correspondingly, with a movement of the controlled virtual object, the camera lens also moves, and the virtual scene image displayed on the terminal screen changes.

The virtual scene includes two symmetric regions. Virtual objects belonging to two hostile camps each occupy a region, and a goal of each side is to destroy a target building/fort/base/crystal deep in the opponent region to win the victory. The symmetric regions are a lower left region and an upper right region, or a middle left region and a middle right region. In some embodiments, a camp in the upper right region is a first camp, and a camp in the lower left region is a second camp. If the controlled virtual object belongs to the first camp, the terminal executes step 202 to change the position where the controlled virtual object is displayed on the terminal screen. If the controlled virtual object belongs to the second camp, the terminal displays the controlled virtual object at a central position of the terminal screen.

202. The terminal displays the controlled virtual object at a target position of the terminal screen when the controlled virtual object belongs to the first camp, the first camp being a camp located at the upper right of the virtual scene, the target position being shifted to an upper right position relative to a central position of the terminal screen.

In this embodiment of the present disclosure, an initial position of the controlled virtual object of the first camp is at the upper right of the virtual scene. That is, the controlled virtual object is born at the upper right of the virtual scene, and correspondingly, another virtual object in a camp different from that of the controlled virtual object has a high probability of appearing at the lower left of the controlled virtual object. The another virtual object in a camp different from that of the controlled virtual object is a virtual object hostile to the controlled virtual object. When the controlled virtual object is displayed at the central position of the terminal screen, a semi-transparent movement control is displayed in the lower left region of the terminal screen, and when the user triggers the movement control with a finger, the movement control will block a virtual scene below the movement control, which narrows a field of vision of the user, making it difficult to find other virtual objects that appear at the lower left of the controlled virtual object. Therefore, when it is determined that the controlled virtual object belongs to the first camp, the terminal controls the controlled virtual object to be displayed at the target position of the terminal screen, that is, an upper right position relative to the central position, which can expand the field of view at the lower left of the controlled virtual object.

In this embodiment of the present disclosure, a method for displaying a virtual scene is provided. When a controlled virtual object belongs to a first camp located at the upper right of a virtual scene, the controlled virtual object is displayed at an upper right position relative to a center of the terminal screen, so that operation controls on the terminal screen do not block a lower left field of vision of a user, and the user will not wrongly judge his or her position, thereby improving human-computer interaction efficiency, and enhancing gaming experience of the user.

FIG. 2 shows a main process of the method for displaying a virtual scene, and the following provides further descriptions based on an application scenario. The method for displaying a virtual scene is applied to a MOBA game. The virtual scene is a virtual scene of the MOBA game, and the virtual scene includes two symmetrical regions: a lower left region and an upper right region. The first camp is located in the upper right region, the second camp is located in the lower left region, and the first camp and the second camp are hostile camps. The terminal can display the controlled virtual object at different positions of the terminal screen according to the camp to which the controlled virtual object belongs. Referring to FIG. 3, FIG. 3 is another flowchart of a method for displaying a virtual scene according to an embodiment of the present disclosure. As shown in FIG. 3, the method for displaying a virtual scene includes the following steps:

301: The terminal displays a virtual scene image on a terminal screen, the virtual scene image including a controlled virtual object in a virtual scene, the controlled virtual object being a virtual object currently controlled by the terminal.

In this embodiment of the present disclosure, the user starts a MOBA game program through the terminal, and the terminal displays a virtual scene image of the MOBA game on the terminal screen. The virtual scene image includes the virtual object controlled by the user through the terminal, that is, the controlled virtual object. The controlled virtual object belongs to the first camp or the second camp. A camp to which the controlled virtual object belongs is randomly assigned by the server.

The controlled virtual object corresponds to a virtual camera, and the virtual camera can obtain the foregoing virtual scene image displayed on the terminal screen by photographing the virtual scene. In the related art, a position where the camera lens of the virtual camera is projected in the virtual scene coincides with a position where the controlled virtual object is located, and the position where the camera lens of the virtual camera is projected in the virtual scene is also a central position of the virtual scene image captured by the virtual camera. Correspondingly, the controlled virtual object is displayed at the central position of the virtual scene image. In addition, relative positions of the camera lens and the controlled virtual object are fixed. When the controlled virtual object moves, the camera lens also moves.

The terminal can determine the camp to which the controlled virtual object belongs through a camp identifier of the controlled virtual object. If the camp identifier indicates that the controlled virtual object belongs to the first camp, the terminal loads the controlled virtual object at an initial position of the first camp. If the camp identifier indicates that the controlled virtual object belongs to the second camp, the terminal loads the controlled virtual object at an initial position of the second camp, where the camp identifier of the controlled virtual object is delivered to the terminal by the server.

An initial position of a camp, expressed in a game term, is a position of a spring where the virtual object is born and resurrected. The user can restore virtual hit points, restore virtual magic points, and purchase virtual props for the controlled virtual object at the initial position.

If the controlled virtual object belongs to the first camp, the controlled virtual object sets off from the upper right of the virtual scene and attacks the lower left region of the virtual scene until a victory goal is completed. At this time, a virtual object of a hostile camp usually appears at the lower left of the controlled virtual object. Therefore, information of the virtual scene displayed at the lower left of the controlled virtual object is valuable to the user. Similarly, if the controlled virtual object belongs to the second camp, information of the virtual scene displayed at the upper right side of the controlled virtual object is valuable to the user. However, because a game interface displayed on the terminal screen is superimposed with operation controls on the virtual scene image, the virtual scene displayed at the lower left of the controlled virtual object will be obscured.

Figure 4:
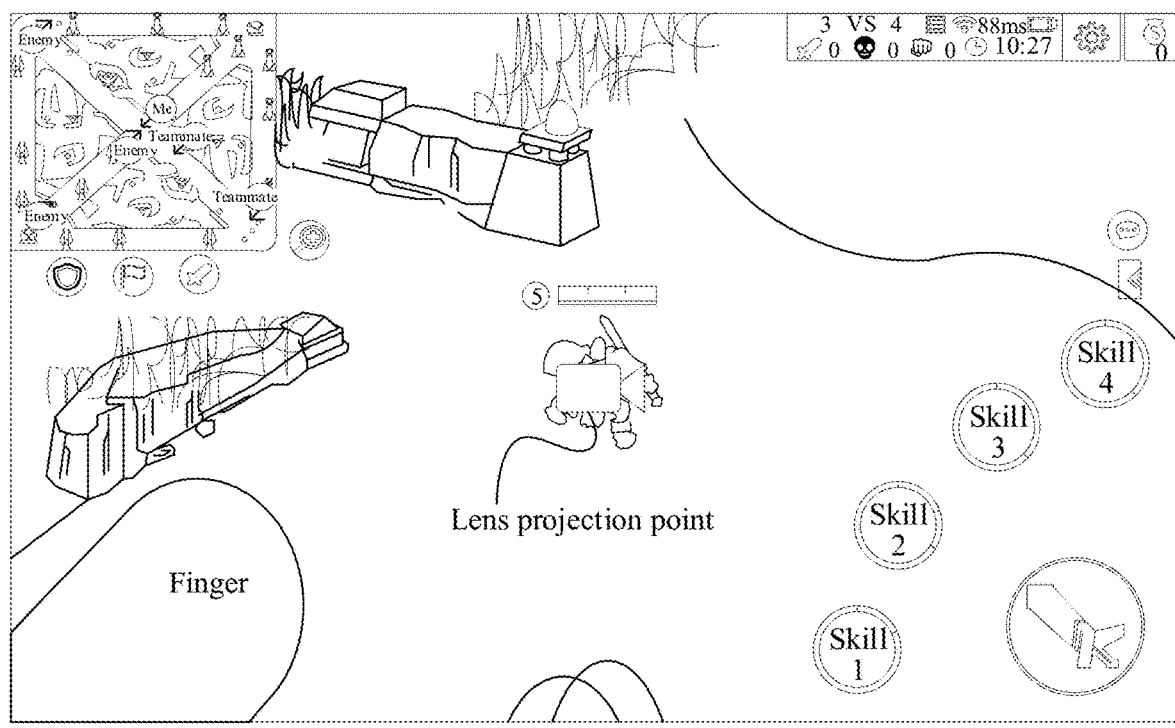
FIG. 4 is a schematic diagram of a game interface according to an embodiment of the present disclosure.

For example, FIG. 4 is a schematic diagram of a game interface according to an embodiment of the present disclosure. As shown in FIG. 4, the game interface is displayed on a terminal screen, and the game interface includes various operation controls superimposed on a virtual scene image, such as a map control, a signal control, a movement control, a skill control, and other controls. Obviously, when the user operates the movement control or other operation control located at a lower left part of the terminal screen through a finger, the virtual scene displayed at the lower left of the controlled virtual object will be blocked.

Therefore, as can be seen from FIG. 4, if the controlled virtual object belongs to the first camp, the virtual scene displayed at the lower left of the controlled virtual object is blocked. As a result, scene information obtained by the user is reduced, and the user cannot find a virtual object of a hostile camp in time, causing low efficiency in the human-computer interaction and decline of gaming experience. Correspondingly, the terminal can perform steps 302 to 304 to adjust a position where the controlled virtual object is displayed on the terminal screen. If the controlled virtual object belongs to the second camp, because the virtual scene displayed on the upper right side of the controlled virtual object is not blocked, the terminal performs step 305, to display the controlled virtual object at the central position of the terminal screen.

302. The terminal obtains a target offset and a first scene position of the controlled virtual object in the virtual scene when the controlled virtual object belongs to the first camp, the target offset being used for adjusting a position of the controlled virtual object displayed on the terminal screen.

In the embodiment of the present disclosure, when the controlled virtual object belongs to the first camp, the terminal can obtain the first scene position where the controlled virtual object is currently located in the virtual scene, and the target offset. In some embodiments, the virtual scene is a three-dimensional scene, a scene position in the virtual scene is represented by three-dimensional coordinates (x, y, z), and the target offset is an offset in a form of a vector.

In some embodiments, the upper right region where the first camp is located can be divided into a plurality of scene regions, and the offsets corresponding to the scene regions are the same or different. The terminal determines the target offset according to the scene region where the controlled virtual object is located. Correspondingly, the step is as follows: the terminal obtains the first scene position of the controlled virtual object in the virtual scene when the controlled virtual object belongs to the first camp. The terminal obtains the target offset according to a scene region to which the first scene position belongs, the target offset being an offset corresponding to the scene region. In some embodiments, with the progress of the game, when a building in the upper right region is destroyed, the offsets corresponding to the scene regions change accordingly.

For example, the upper right region is divided into a top field region, a middle field region, a bottom field region, and a highland region. In the top field region, the virtual object of the hostile camp cannot appear from an upper side of the controlled virtual object, but will probably appear from left and lower sides of the controlled virtual object, and is less likely to appear from a right side of the controlled virtual object. Therefore, the target offset will make a position where the controlled virtual object is displayed shifted to an upper right position by a relatively large distance. In the bottom field region, the virtual object of the hostile camp cannot appear from a lower side of the controlled virtual object, but will probably appear from left and upper sides of the controlled virtual object, and is less likely to appear from a right side of the controlled virtual object. Therefore, the target offset will make a position where the controlled virtual object is displayed shifted to an upper right position by a relatively small distance. In the middle field region, the virtual object of the hostile camp probably appears from the left, upper and lower vertical lines of the virtual object, and is less likely to appear from the right side of the controlled virtual object. Therefore, the target offset will make a position where the controlled virtual object is displayed shifted to an upper right position by a medium distance. For the highland region, before defense towers in the upper, middle and lower field regions are destroyed, the virtual objects of the hostile camp almost do not appear in the highland region. Therefore, the terminal can temporarily skip adjusting the position where the controlled virtual object is displayed in the highland region. Correspondingly, if a defense tower in any one of the field regions is destroyed, a neighboring field region will be affected. For example, if a defense tower in the top field region is destroyed, for the middle field region, the virtual object of the hostile camp is more likely to appear from the upper side of the controlled virtual object, and the terminal can correspondingly adjust an offset corresponding to the middle field region, to display a larger area of the scene on the upper side of the controlled virtual object. If all defense towers in any of the field regions are destroyed, the virtual object of the hostile camp can appear in the highland region, and correspondingly, the terminal adjusts an offset corresponding to the highland region.

In some embodiments, the terminal can also determine the target offset according to a scene position of the virtual object of the hostile camp near the controlled virtual object. Correspondingly, the step is as follows: the terminal obtains the first scene position of the controlled virtual object in the virtual scene when the controlled virtual object belongs to the first camp. The terminal obtains a third scene position of a target virtual object meeting a target condition, the target virtual object belonging to the second camp. The terminal determines the target offset according to the first scene position and the third scene position. The target offset is determined according to positions of other virtual objects of the hostile camp, to dynamically adjust the position where the controlled virtual object is displayed on the terminal screen.

In some embodiments, the target condition includes at least one of the following: a distance from the controlled virtual object is less than a first distance, virtual hit points are less than or equal to a hit point threshold, or a latest attack from the controlled virtual object is received. The target condition is not limited in the embodiments of the present disclosure.

For example, when there is a target virtual object whose distance from the controlled virtual object is less than the first distance, the terminal can move the camera lens to a position between the controlled virtual object and the target virtual object according to the target offset determined by the first scene position and the third scene position, to ensure that the user can view complete confrontation between the controlled virtual object and the target virtual object. When there is a target virtual object whose virtual hit points are less than or equal to the hit point threshold, the terminal can move the camera lens to a position between the controlled virtual object and the target virtual object according to the target offset determined by the first scene position and the third scene position, so that the user can view the target virtual object having low virtual hit points, so as to control the controlled virtual object to attack the target virtual object. When a target virtual object has received a latest attack by the controlled virtual object, the terminal can move the camera lens to a position between the controlled virtual object and the target virtual object according to the target offset determined by the first scene position and the third scene position, to ensure that the user can focus on fighting against the target virtual object.

In some embodiments, the terminal can select the target virtual object with the first scene position as a center. Correspondingly, the terminal first obtains at least one virtual object belonging to the second camp within a target range centered on the first scene position, a diameter of the target range being a second distance. The terminal determines a virtual object meeting the target condition in the at least one virtual object as the target virtual object. The terminal obtains the third scene position of the target virtual object. In some embodiments, the terminal can determine the target virtual object in real time according to the foregoing method, and when there are a plurality of virtual objects meeting the target condition, the terminal can also determine the target virtual object according to a selection operation of the user.

For example, the first distance is an attack distance of the controlled virtual object, and the terminal determines a virtual object of the hostile camp within the attack range of the controlled virtual object as the target virtual object. Certainly, if there are a plurality virtual objects of the hostile camp within the attack range of the controlled virtual object, the terminal determines a virtual object of the hostile camp closest to the controlled virtual object as the target virtual object; or determine a virtual object of the hostile camp whose virtual hit points are less than or equal to the hit point threshold as the target virtual object; or determine a virtual object of the hostile camp with lowest virtual hit points as the target virtual object; or determine a virtual object of the hostile camp that receives a latest attack of the controlled virtual object as the target virtual object. In addition, if the first distance is a diameter of a field of view of the controlled virtual object, and an attack distance of the controlled virtual object is less than the first distance, the terminal determines a virtual object of the hostile camp that is within the field of view of the controlled virtual object but outside an attack range as the target virtual object.

303. The terminal determines a second scene position according to the target offset and the first scene position.

In this embodiment of the present disclosure, the terminal can determine a sum of the target offset and the first scene position as the second scene position. In some embodiments, the terminal establishes a rectangular coordinate system with the first scene position as an origin, and then determines the second scene position according to the target offset in a form of a vector.

Figure 5:
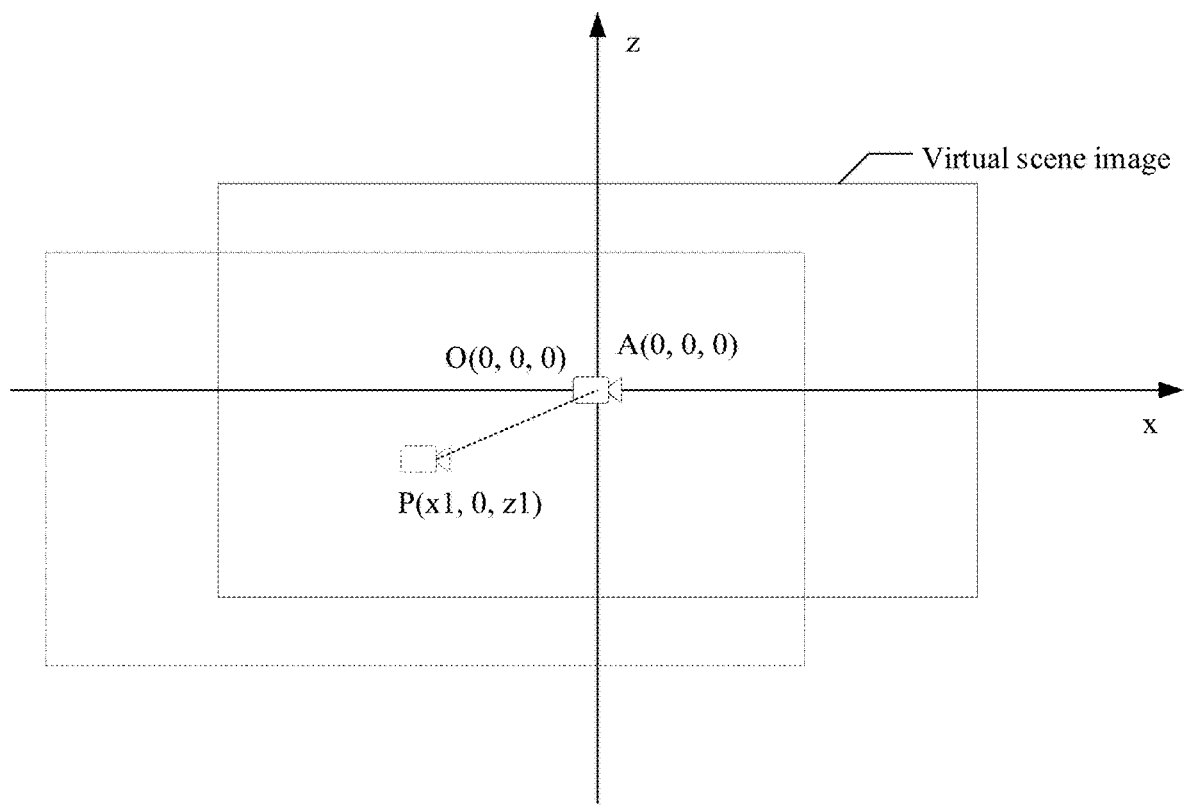
FIG. 5 is a schematic diagram of determining a scene position according to an embodiment of the present disclosure.

For example, FIG. 5 is a schematic diagram of determining a scene position according to an embodiment of the present disclosure. As shown in FIG. 5, a scene position corresponding to the camera lens in the virtual scene is A, which coincides with the first scene position. The first scene position is O (0,0,0), and the target offset is $\overrightarrow{OP}$ (x1,0,z1). Then, the second scene position, that is, a scene position corresponding to the moved camera lens in the virtual scene, is determined by a formula (1).

$$f(A) = \overrightarrow{AO} + \overrightarrow{OP} \quad (1)$$

where f(A) represents the second scene position, $\overrightarrow{AO}$ represents a vector between the scene position corresponding to the camera lens in the virtual scene and the first scene position, and $\overrightarrow{OP}$ represents the target offset.

304. The terminal moves a camera lens, so that a lens projection point is moved to the second scene position, and the controlled virtual object is displayed at the target position of the terminal screen, the camera lens being used for photographing the virtual scene to obtain the virtual scene image displayed on the terminal screen, the lens projection point being a scene position corresponding to the camera lens in the virtual scene, the target position being shifted to an upper right position relative to a central position of the terminal screen.

In this embodiment of the present disclosure, the terminal can change the scene position corresponding to the camera lens in the virtual scene, that is, the lens projection point, by moving the camera lens. After obtaining the second scene position, the terminal can move the camera lens, so that the lens projection point of the moved camera lens coincides with the second scene position. At this time, because the position of the controlled virtual object is unchanged, the controlled virtual object is displayed at a target position at the upper right relative to the central position of the terminal screen after the camera lens is moved. In some embodiments, when controlling the camera lens to move, the terminal can obtain lens attribute information. The lens attribute information is used for indicating at least one of a moving speed and a moving manner of the camera lens, and the terminal moves the camera lens according to the lens attribute information.

Figure 6:
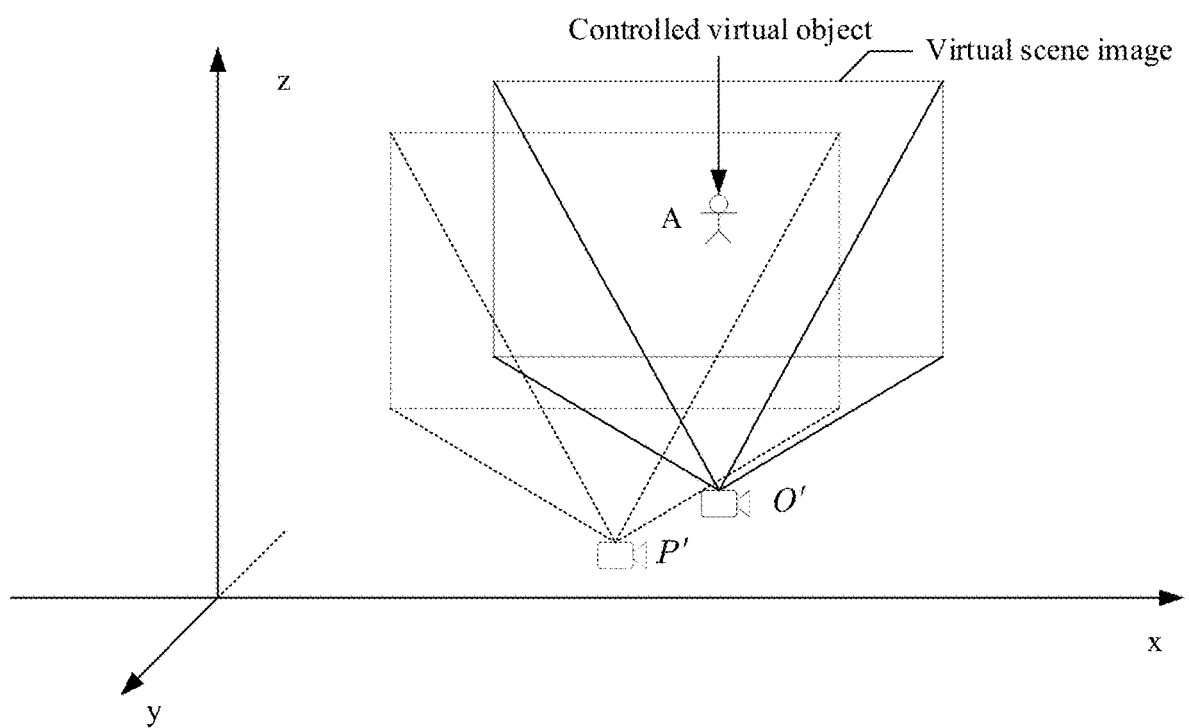
FIG. 6 is a schematic diagram of moving a camera lens according to an embodiment of the present disclosure.

For example, FIG. 6 is a schematic diagram of moving a camera lens according to an embodiment of the present disclosure. As shown in FIG. 6, O' represents a current position of the camera lens, and A represents the first scene position of the controlled virtual object. A projection position corresponding to the camera lens in the virtual scene coincides with the first scene position, that is, located at a central position of a virtual scene image captured by the camera lens. The terminal controls the camera lens to move from O' to a position where P' is located, so that a position of the controlled virtual object in the virtual scene image changes to an upper right position relative to the central position.

In some embodiments, the terminal obtains a target distance when the controlled virtual object belongs to the first camp, the target distance being a distance between a current scene position of the controlled virtual object and an initial position corresponding to the first camp. The terminal displays the controlled virtual object at the target position of the terminal screen in response to the target distance being greater than a distance threshold. The position where the controlled virtual object is displayed on the terminal screen is changed after the controlled virtual object leaves a certain range centered on the initial position, which can be more in line with a progress of the MOBA game and bring better gaming experience to the user. In some embodiments, the terminal obtains a target duration when the controlled virtual object belongs to the first camp, the target duration being a duration in which the controlled virtual object is generated. Then the terminal displays the controlled virtual object at the target position of the terminal screen in response to the target duration being greater than a duration threshold. The position where the controlled virtual object is displayed on the terminal screen is changed after a target duration since the controlled virtual object is born, which can be more in line with a progress of the MOBA game and bring better gaming experience to the user.

305. The terminal controls the controlled virtual object to be displayed at the central position of the terminal screen in response to that the controlled virtual object belongs to a second camp, the second camp being a camp located at the lower left of the virtual scene.

In this embodiment of the present disclosure, if the controlled virtual object belongs to the second camp, the terminal can display the controlled virtual object at the central position of the terminal screen. Certainly, the terminal can also adjust the position where the controlled virtual object is displayed on the terminal screen according to the scene position of the controlled virtual object in the virtual scene. For example, when the controlled virtual object is in the top field region and the bottom field region, the controlled virtual object is displayed on the left of the center of the terminal screen, which is not limited in this embodiment of the present disclosure.

Figure 7:
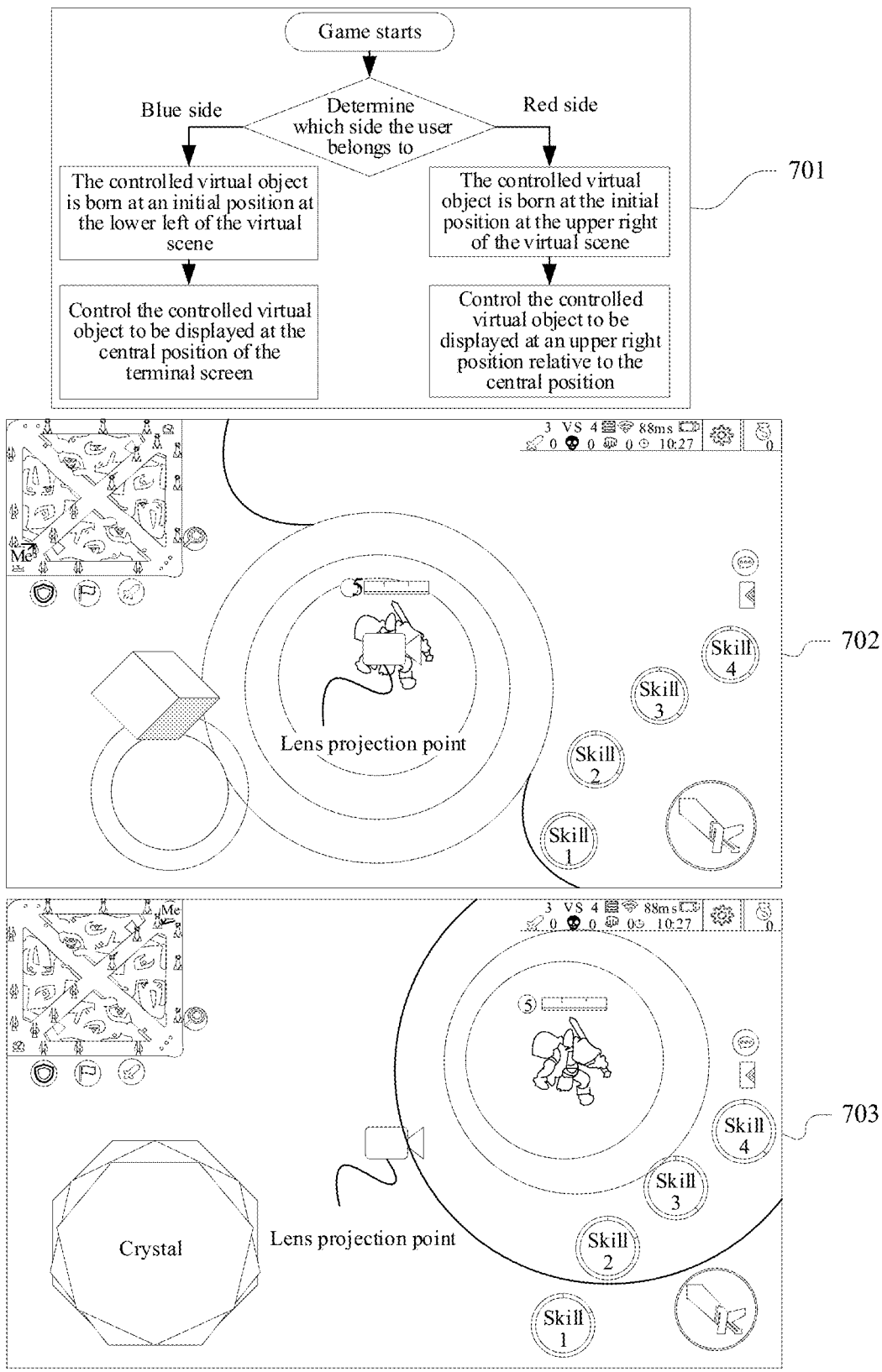
FIG. 7 is a schematic diagram of a game interface according to an embodiment of the present disclosure.

For example, FIG. 7 is a schematic diagram of a game interface according to an embodiment of the present disclosure. As shown in FIG. 7, 701 is a schematic diagram of determination logic of the terminal. When the game starts, the terminal determines which side the user belongs to. If the user belongs to a blue side, the controlled virtual object controlled by the user belongs to the second camp, the controlled virtual object is born at the initial position at the lower left of the virtual scene, and the terminal displays the controlled virtual object at the central position of the terminal screen. If the user belongs to a red side, the controlled virtual object controlled by the user belongs to the first camp, the controlled virtual object is born at the initial position at the upper right of the virtual scene, and the terminal displays the controlled virtual object at an upper right position relative to the central position of the terminal screen. 702 indicates that the controlled virtual object belongs to the second camp, and in this case, the terminal controls the controlled virtual object to be displayed at the central position of the terminal screen. 703 indicates that the controlled virtual object belongs to the first camp, and in this case, the terminal controls the controlled virtual object to be displayed at an upper right position relative to the central position.

In some embodiments, the terminal can also control the camera lens to move according to a dragging operation on the camera lens by the user, then determine, according to a lens locking operation by the user, an offset set by the user through the lens dragging operation. Then, the controlled virtual object is displayed on the terminal screen with the offset being maintained, until the user unlocks the lens.

Figure 8:
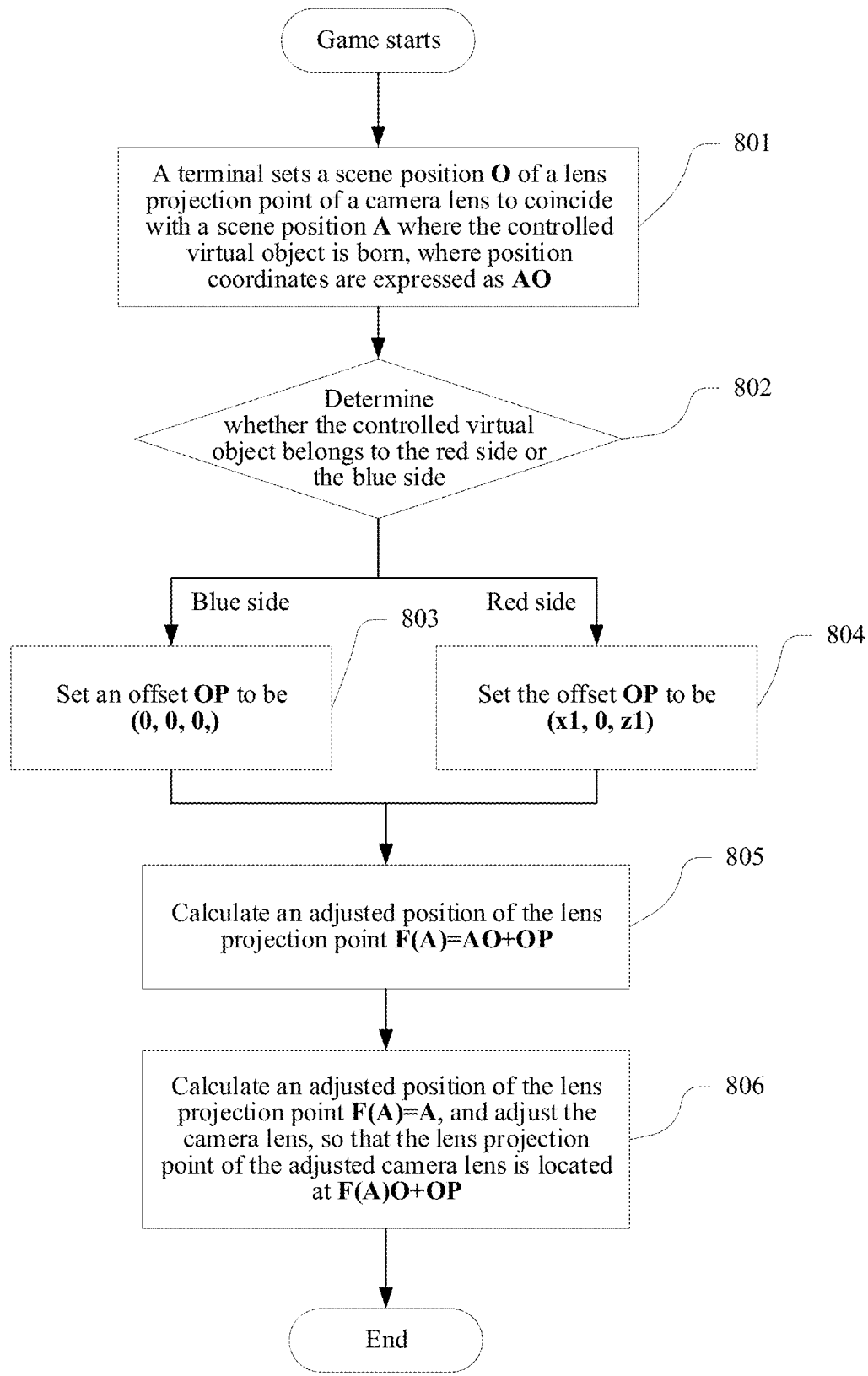
FIG. 8 is another flowchart of a method for displaying a virtual scene according to an embodiment of the present disclosure.

The foregoing steps 301 to 305 are examples of the method for displaying a virtual scene according to the embodiments of the present disclosure. Correspondingly, the terminal can also be implemented in other manners. For example, FIG. 8 is another flowchart of a method for displaying a virtual scene according to an embodiment of the present disclosure. As shown in FIG. 8, the method includes the following steps after the game is started: 801. A terminal sets a scene position O of a lens projection point of a camera lens to coincide with a scene position A where a controlled virtual object is born, where position coordinates are expressed as AO. 802. The terminal determines whether the controlled virtual object belongs to a red side or a blue side. 803. If the controlled virtual object belongs to the blue side, the terminal sets an offset OP to be (0, 0, 0). 804. If the controlled virtual object belongs to the red side, the terminal sets the offset OP to be (x1, 0, z1). 805. The terminal calculates an adjusted position F(A) of the lens projection point. 806. Move the camera lens, so that the lens projection point of the moved camera lens is located at F(A).

The red side is equivalent to the first camp, and the blue side is equivalent to the second camp.

Figure 9:
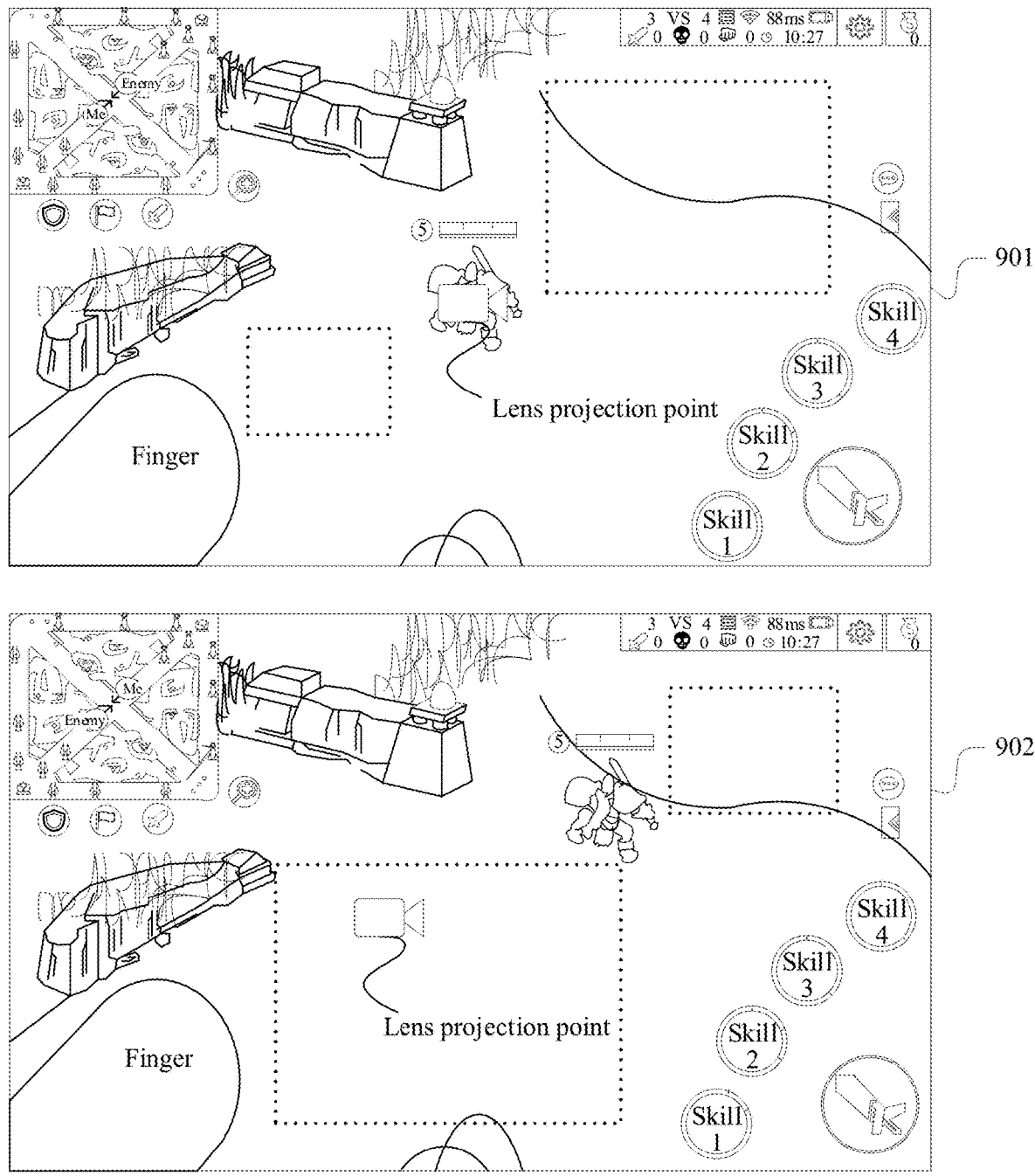
FIG. 9 is an effect comparison diagram according to an embodiment of the present disclosure.

In addition, in order to make an effect produced by the method for displaying a virtual scene according to the embodiments of the present disclosure more intuitive, FIG. 9 is an effect comparison diagram according to an embodiment of the present disclosure. As shown in FIG. 9, 901 indicates that the controlled virtual object is displayed at the central position of the terminal screen when the method for displaying a virtual scene provided in the embodiments of the present disclosure is not adopted. In this case, most of the virtual scene at the lower left of the controlled virtual object is blocked by a finger, as indicated by a dotted box. 902 indicates that the controlled virtual object is displayed at an upper right position relative to the central position of the terminal screen when the method for displaying a virtual scene provided in the embodiments of the present disclosure. In this case, a larger area of the virtual scenes is displayed at the lower left of the controlled virtual object, as shown in the dotted box, and the user can discover the virtual object of the hostile camp in time, which brings better gaming experience to the user.

In the embodiment of the present disclosure, a method for displaying a virtual scene is provided. When a controlled virtual object belongs to a first camp located at the upper right of a virtual scene, the controlled virtual object is displayed at an upper right position relative to a center of the terminal screen, so that operation controls on the terminal screen do not block a lower left field of vision of a user, and the user will not wrongly judge his or her position, thereby improving human-computer interaction efficiency, and enhancing gaming experience of the user.

Figure 10:
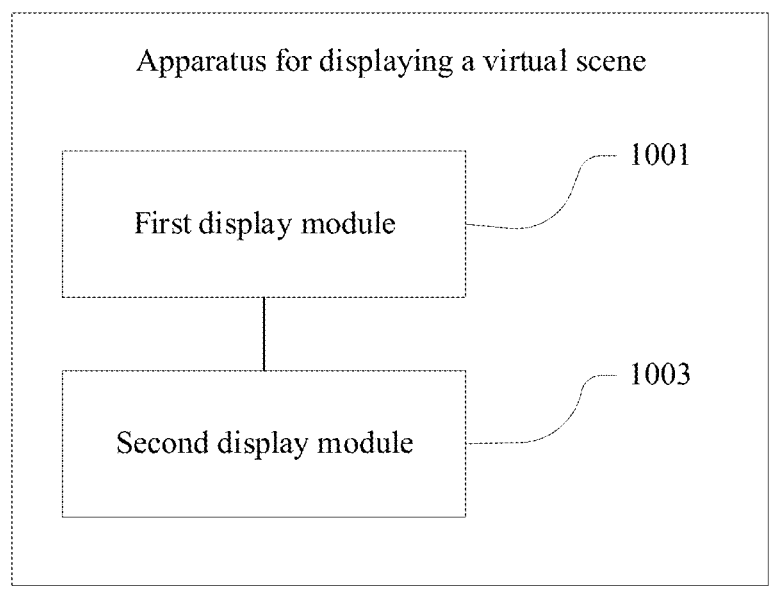
FIG. 10 is a block diagram of an apparatus for displaying a virtual scene according to an embodiment of the present disclosure.

FIG. 10 is a block diagram of an apparatus for displaying a virtual scene according to an embodiment of the present disclosure. The apparatus is used for performing the steps when the foregoing method for displaying a virtual scene is performed. Referring to FIG. 10, the apparatus includes: a first display module 1001 and a second display module 1002.

The first display module 1001 is configured to display a virtual scene image on a terminal screen, the virtual scene image including a controlled virtual object in a virtual scene, the controlled virtual object being a virtual object currently controlled by a terminal.

The second display module 1002 is configured to display the controlled virtual object at a target position of the terminal screen when the controlled virtual object belongs to the first camp, the first camp being a camp located at the upper right of the virtual scene, the target position being shifted to an upper right position relative to a central position of the terminal screen.

In some embodiments, the second display module 1002 includes:
 a position obtaining unit, configured to obtain a target offset and a first scene position of the controlled virtual object in the virtual scene when the controlled virtual object belongs to the first camp, the target offset being used for adjusting a position of the controlled virtual object displayed on the terminal screen;
 a position determining unit, configured to determine a second scene position according to the target offset and the first scene position; and
 a camera lens controlling unit, configured to move a camera lens, so that a lens projection point is moved to the second scene position, and the controlled virtual object is displayed at the target position of the terminal screen, the camera lens being used for photographing the virtual scene to obtain the virtual scene image displayed on the terminal screen, the lens projection point being a scene position corresponding to the camera lens in the virtual scene.

In some embodiments, the position obtaining unit is configured to obtain the first scene position of the controlled virtual object in the virtual scene when the controlled virtual object belongs to the first camp; and obtain the target offset according to a scene region to which the first scene position belongs, the target offset being an offset corresponding to the scene region.

In some embodiments, the position obtaining unit includes:

a first position obtaining subunit, configured to obtain the first scene position of the controlled virtual object in the virtual scene when the controlled virtual object belongs to the first camp;

a second position obtaining subunit, configured to obtain a third scene position of a target virtual object meeting a target condition, the target virtual object belonging to the second camp; and an offset determining subunit, configured to determine the target offset according to the first scene position and the third scene position.

In some embodiments, the target condition includes at least one of the following:

a distance from the controlled virtual object is less than a first distance;

virtual hit points are less than or equal to a hit point threshold; and a latest attack by the controlled virtual object has been received.

In some embodiments, the second position obtaining subunit is configured to obtain at least one virtual object belonging to the second camp within a target range centered on the first scene position; determine a virtual object meeting the target condition in the at least one virtual object as the target virtual object; and obtain the third scene position of the target virtual object.

In some embodiments, the position determining unit is configured to determine a sum of the target offset and the first scene position as the second scene position.

In some embodiments, the camera lens controlling unit is configured to obtain lens attribute information, the lens attribute information indicating at least one of a moving speed and a moving manner of the camera lens; and move the camera lens according to the lens attribute information.

In some embodiments, the second display module 1002 is configured to obtain a target distance when the controlled virtual object belongs to the first camp, the target distance being a distance between a current scene position of the controlled virtual object and an initial position corresponding to the first camp; and display the controlled virtual object at the target position of the terminal screen in response to the target distance being greater than a distance threshold.

In some embodiments, the second display module 1002 is configured to obtain a target duration when the controlled virtual object belongs to the first camp, the target duration being a duration in which the controlled virtual object is generated; and display the controlled virtual object at the target position of the terminal screen in response to the target duration being greater than a duration threshold.

In this embodiment of the present disclosure, a method for displaying a virtual scene is provided. When a controlled virtual object belongs to a first camp located at the upper right of a virtual scene, the controlled virtual object is displayed at an upper right position relative to a center of the terminal screen, so that operation controls on the terminal screen do not block a lower left field of vision of a user, and the user will not wrongly judge his or her position, thereby improving human-computer interaction efficiency, and enhancing gaming experience of the user.

The division of the above functional modules is only described for exemplary purposes when the apparatus for displaying a virtual scene provided in the foregoing embodiment runs an application. In actual application, the functions may be allocated to different functional modules according to specific needs, which means that the internal structure of the apparatus is divided into different functional modules to complete all or some of the above described functions. In addition, the apparatus for displaying a virtual scene provided in the foregoing embodiments belongs to the same concept as the embodiments of the method for displaying a virtual scene. For a specific implementation process of the apparatus, refer to the method embodiment. Details are not described herein again.

The term unit (and other similar terms such as subunit, module, submodule, etc.) in this disclosure may refer to a software unit, a hardware unit, or a combination thereof. A software unit (e.g., computer program) may be developed using a computer programming language. A hardware unit may be implemented using processing circuitry and/or memory. Each unit can be implemented using one or more processors (or processors and memory). Likewise, a processor (or processors and memory) can be used to implement one or more units. Moreover, each unit can be part of an overall unit that includes the functionalities of the unit.

The embodiments of the present disclosure provide a terminal, including one or more processors and one or more memories, the one or more memories storing at least one piece of program code, the program code being loaded by the one or more processors to implement the following steps:

displaying a virtual scene image on a terminal screen, the virtual scene image including a controlled virtual object in a virtual scene, the controlled virtual object being a virtual object currently controlled by a terminal, and displaying the controlled virtual object at a target position of the terminal screen when the controlled virtual object belongs to the first camp, the first camp being a camp located at the upper right of the virtual scene, the target position being shifted to an upper right position relative to a central position of the terminal screen.

In one embodiment, the displaying the controlled virtual object at a target position of the terminal screen when the controlled virtual object belongs to a first camp includes:

obtaining a target offset and a first scene position of the controlled virtual object in the virtual scene when the controlled virtual object belongs to the first camp, the target offset being used for adjusting a position of the controlled virtual object displayed on the terminal screen;

determining a second scene position according to the target offset and the first scene position; and moving a camera lens, so that a lens projection point is moved to the second scene position, and the controlled virtual object is displayed at the target position of the terminal screen, the camera lens being used for photographing the virtual scene to obtain the virtual scene image displayed on the terminal screen, the lens projection point being a scene position corresponding to the camera lens in the virtual scene.

In one embodiment, the obtaining a target offset and a first scene position of the controlled virtual object in the virtual scene when the controlled virtual object belongs to the first camp includes:

obtaining the first scene position of the controlled virtual object in the virtual scene when the controlled virtual object belongs to the first camp; and obtaining the target offset according to a scene region to which the first scene position belongs, the target offset being an offset corresponding to the scene region.

In one embodiment, the obtaining a target offset and a first scene position of the controlled virtual object in the virtual scene when the controlled virtual object belongs to the first camp includes:

obtaining the first scene position of the controlled virtual object in the virtual scene when the controlled virtual object belongs to the first camp;

obtaining a third scene position of a target virtual object meeting a target condition, the target virtual object belonging to the second camp; and determining the target offset according to the first scene position and the third scene position.

In one embodiment, the target condition includes at least one of the following:

a distance from the controlled virtual object is less than a first distance;

virtual hit points are less than or equal to a hit point threshold; and a latest attack by the controlled virtual object has been received.

In one embodiment, the obtaining a third scene position of a target virtual object meeting a target condition includes:

obtaining at least one virtual object belonging to the second camp within a target range centered on the first scene position;

determining a virtual object meeting the target condition in the at least one virtual object as the target virtual object; and obtaining the third scene position of the target virtual object.

In one embodiment, the determining a second scene position according to the target offset and the first scene position includes:

determining a sum of the target offset and the first scene position as the second scene position.

In one embodiment manner, the moving the camera lens includes:

obtaining lens attribute information, the lens attribute information indicating at least one of a moving speed and a moving manner of the camera lens; and moving the camera lens according to the lens attribute information.

In one embodiment, the displaying the controlled virtual object at a target position of the terminal screen when the controlled virtual object belongs to a first camp includes:

obtaining a target distance when the controlled virtual object belongs to the first camp, the target distance being a distance between a current scene position of the controlled virtual object and an initial position corresponding to the first camp; and displaying the controlled virtual object at the target position of the terminal screen in response to the target distance being greater than a distance threshold.

In one embodiment, the displaying the controlled virtual object at a target position of the terminal screen when the controlled virtual object belongs to a first camp includes:

obtaining a target duration when the controlled virtual object belongs to the first camp, the target duration being a duration in which the controlled virtual object is generated; and displaying the controlled virtual object at the target position of the terminal screen in response to the target duration being greater than a duration threshold.

Figure 11:
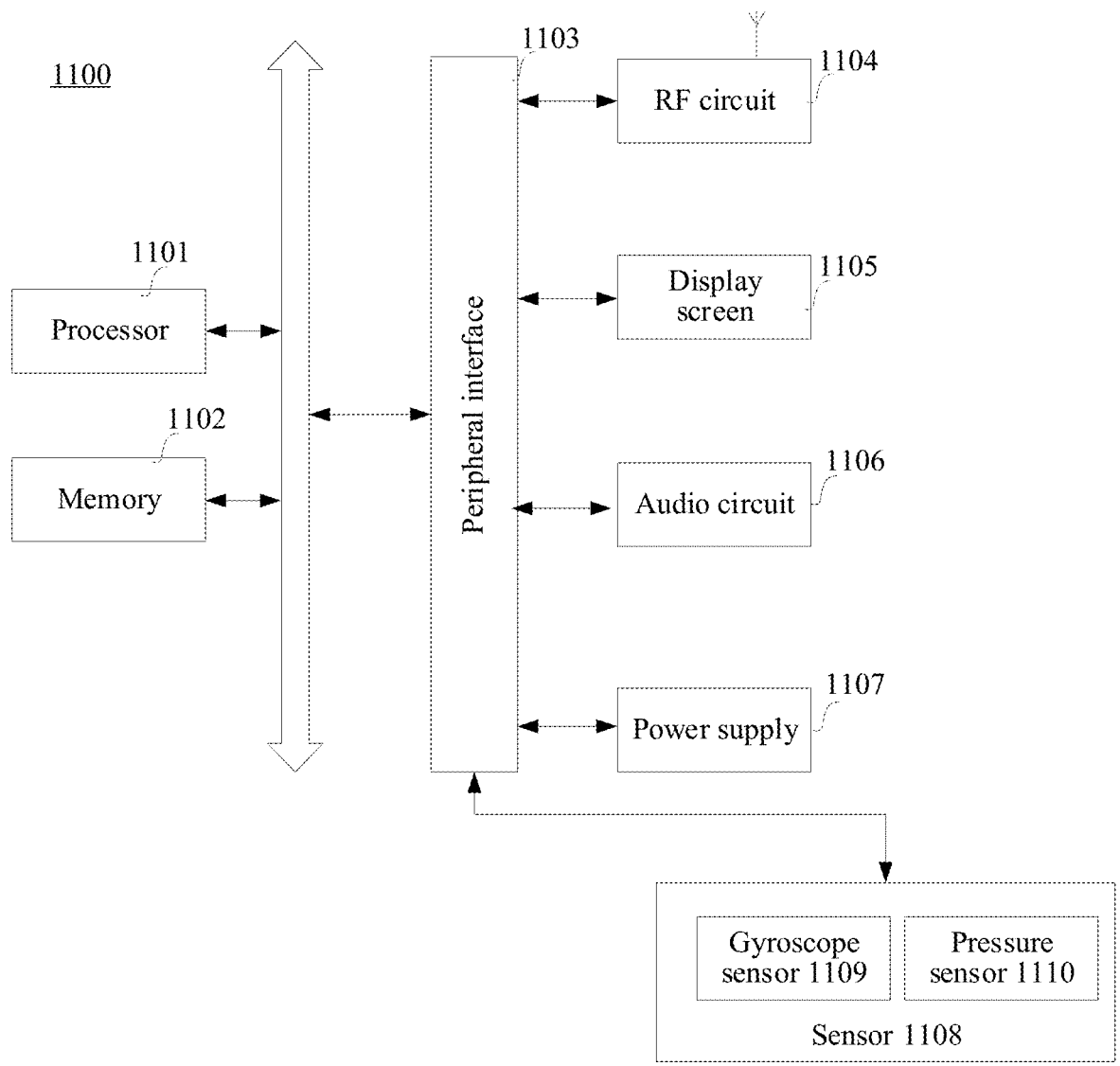
FIG. 11 is a structural block diagram of a terminal according to an embodiment of the present disclosure.

FIG. 11 is a structural block diagram of a terminal 1100 according to an embodiment of the present disclosure. The terminal 1100 may be a portable mobile terminal, such as a smartphone, a tablet computer, a notebook computer, or a desktop computer. The terminal 1100 may also be called other names such as user equipment, a portable terminal, a laptop terminal, or a desktop terminal.

Generally, the terminal 1100 includes a processor 1101 and a memory 1102.

The processor 1101 may include one or more processing cores, for example, a 4-core processor or an 8-core processor. In some embodiments, the processor 1101 may be integrated with a graphics processing unit (GPU). The GPU is configured to render and draw content that needs to be displayed on a display screen. In some embodiments, the processor 1101 may further include an artificial intelligence (AI) processor. The AI processor is configured to process computing operations related to machine learning.

The memory 1102 may include one or more computer-readable storage media that may be non-transitory. The memory 1102 may further include a high-speed random access memory and a nonvolatile memory, for example, one or more disk storage devices or flash storage devices.

In some embodiments, the terminal 1100 may further include a peripheral interface 1103 and at least one peripheral. The processor 1101, the memory 1102, and the peripheral interface 1103 may be connected by a bus or a signal line. Each peripheral may be connected to the peripheral interface 1103 by using a bus, a signal cable, or a circuit board. The peripheral includes: at least one of a radio frequency (RF) circuit 1104, a display screen 1105, an audio circuit 1106, and a power supply 1107.

The peripheral interface 1103 may be configured to connect at least one input/output (I/O)-related peripheral to the processor 1101 and the memory 1102. In some embodiments, the processor 1101, the memory 1102, and the peripheral interface 1103 are integrated on the same chip or the same circuit board. In some other embodiments, any or both of the processor 1101, the memory 1102, and the peripheral interface 1103 may be implemented on an independent chip or circuit board, which is not limited in this embodiment.

The RF circuit 1104 is configured to receive and transmit an RF signal, which is also referred to as an electromagnetic signal. The RF circuit 1104 communicates with a communication network and another communication device by using the electromagnetic signal. The RF circuit 1104 converts an electrical signal into an electromagnetic signal for transmission, or converts a received electromagnetic signal into an electrical signal.

The display screen 1105 is configured to display a user interface (UI). The UI may include a graph, a text, an icon, a video, and any combination thereof. When the display screen 1105 is a touch display screen, the display screen 1105 is further capable of collecting touch signals on or above a surface of the display screen 1105. The touch signal may be inputted to the processor 1101 as a control signal for processing. In this case, the display screen 1105 may be further configured to provide a virtual button and/or a virtual keyboard, which is also referred to as a soft button and/or a soft keyboard. In some embodiments, there may be one display screen 1105, disposed on a front panel of the terminal 1100.

The audio circuit 1106 may include a microphone and a loudspeaker. The microphone is configured to acquire sound waves of a user and an environment, and convert the sound waves into an electrical signal to input to the processor 1101 for processing, or input to the radio frequency circuit 1104 for implementing voice communication. For the purpose of stereo acquisition or noise reduction, there may be a plurality of microphones, respectively disposed at different portions of the terminal 1100. The microphone may further be an array microphone or an omni-directional acquisition type microphone. The speaker is configured to convert electric signals from the processor 1101 or the RF circuit 1104 into sound waves. The speaker may be a conventional thin-film speaker or a piezoelectric ceramic speaker. When the speaker is the piezoelectric ceramic speaker, the speaker can not only convert an electric signal into sound waves audible to a human being, but also convert an electric signal into sound waves inaudible to the human being for ranging and other purposes. In some embodiments, the audio circuit 1106 may also include an earphone jack.

The power supply 1107 is configured to supply power to components in the terminal 1100. The power supply 1107 may be an alternating-current power supply, a direct-current power supply, a disposable battery, or a rechargeable battery. When the power supply 1107 includes a rechargeable battery, and the rechargeable battery may be a wired rechargeable battery or a wireless rechargeable battery. The wired rechargeable battery is a battery charged through a wired circuit, and the wireless rechargeable battery is a battery charged through a wireless coil. The rechargeable battery may further be configured to support a quick charge technology.

In some embodiments, the terminal 1100 further includes one or more sensors 1108. The one or more sensors 1108 include, but are not limited to: a gyroscope sensor 1109, and a pressure sensor 1110.

The gyroscope sensor 1109 may detect a body direction and a rotation angle of the terminal 1100, and may work with the acceleration sensor 1111 to collect a 3D action performed by the user on the terminal 1100. The processor 1101 may implement the following functions according to data collected by the gyroscope sensor 1109: motion sensing (for example, the UI is changed according to a tilt operation of the user), image stabilization during shooting, game control, and inertial navigation.

The pressure sensor 1110 may be disposed at a side frame of the terminal 1100 and/or a lower layer of the display screen 1105. When the pressure sensor 1110 is disposed at the side frame of the terminal 1100, a holding signal of the user on the terminal 1100 may be detected. The processor 1101 performs left and right hand recognition or a quick operation according to the holding signal acquired by the pressure sensor 1110.

A person skilled in the art may understand that the structure shown in FIG. 11 does not constitute a limitation to the terminal 1100, and the terminal may include more or fewer components than those shown in the figure, or some components may be combined, or a different component arrangement may be used.

An embodiment of the present disclosure further provides a computer-readable storage medium, applicable to a terminal. The computer-readable storage medium stores at least one computer program, the at least one computer program being loaded and executed by a processor to implement the operations performed by the terminal in the method for displaying a virtual scene according to the foregoing embodiments.

An embodiment of the present disclosure further provides a computer program product or a computer program. The computer program product or the computer program stores computer program code, the computer program code being stored in a computer-readable storage medium. A processor of a terminal reads the computer program code from the computer-readable storage medium, and executes the computer program code, to cause the terminal to perform the method for displaying a virtual scene provided in the foregoing example embodiments.

A person of ordinary skill in the art may understand that all or some of the steps of the embodiments may be implemented by hardware or a program instructing related hardware. The program may be stored in a computer-readable storage medium. The storage medium may include: a read-only memory, a magnetic disk, or an optical disc.

The foregoing descriptions are merely example embodiments of the present disclosure, but are not intended to limit the present disclosure. Any modification, equivalent replacement, or improvement made without departing from the spirit and principle of the present disclosure is to fall within the protection scope of the present disclosure.

What is claimed is:

1. A method for displaying a virtual scene, performed by a mobile terminal, comprising:
   displaying, by a processor of the mobile terminal, a virtual scene image of a multiplayer online battle arena (MOBA) game on a terminal screen of the mobile terminal, the virtual scene image comprising a controlled virtual object in a virtual scene, the controlled virtual object being a virtual object currently controlled by the terminal, and the MOBA game comprising a first camp based at an upper right corner of the virtual scene and a second camp based at a lower left corner of the virtual scene;
   displaying the controlled virtual object at a central position of the terminal screen in response to that the controlled virtual object belongs to the second camp; and
   displaying the controlled virtual object at a target position of the terminal screen in response to that the controlled virtual object belongs to the first camp, the target position being shifted to an upper right position relative to the central position of the terminal screen.

2. The method according to claim 1, further comprising:
   displaying an operation control in a lower left part of the terminal screen;
   wherein the virtual object is controlled in response to a user touch operation on the operation control.

3. The method according to claim 1, wherein the displaying the controlled virtual object at the target position of the terminal screen in response to that the controlled virtual object belongs to the first camp comprises:
   obtaining a target offset and a first scene position of the controlled virtual object in the virtual scene when the controlled virtual object belongs to the first camp, the target offset being used for adjusting a position of the controlled virtual object displayed on the terminal screen;
   determining a second scene position according to the target offset and the first scene position; and
   moving a camera lens, wherein a lens projection point is moved to the second scene position, and the controlled virtual object is displayed at the target position of the terminal screen, the camera lens being used for photographing the virtual scene to obtain the virtual scene image displayed on the terminal screen, the lens projection point being a scene position corresponding to the camera lens in the virtual scene.

4. The method according to claim 3, wherein the obtaining a target offset and a first scene position of the controlled virtual object in the virtual scene when the controlled virtual object belongs to the first camp comprises:
   obtaining the first scene position of the controlled virtual object in the virtual scene when the controlled virtual object belongs to the first camp; and obtaining the target offset according to a scene region to which the first scene position belongs, the target offset being an offset corresponding to the scene region.

5. The method according to claim 3, wherein the obtaining a target offset and a first scene position of the controlled virtual object in the virtual scene when the controlled virtual object belongs to the first camp comprises:
obtaining the first scene position of the controlled virtual object in the virtual scene when the controlled virtual object belongs to the first camp;
obtaining a third scene position of a target virtual object meeting a target condition, the target virtual object belonging to the second camp; and
determining the target offset according to the first scene position and the third scene position.

6. The method according to claim 5, wherein the target condition comprises at least one of:
a distance from the controlled virtual object is less than a first distance;
virtual hit points are less than or equal to a hit point threshold; and
a latest attack by the controlled virtual object has been received.

7. The method according to claim 5, wherein the obtaining a third scene position of a target virtual object meeting a target condition comprises:
obtaining at least one virtual object belonging to the second camp within a target range centered on the first scene position;
determining a virtual object meeting the target condition in the at least one virtual object as the target virtual object; and
obtaining the third scene position of the target virtual object.

8. The method according to claim 3, wherein the determining a second scene position according to the target offset and the first scene position comprises:
determining a sum of the target offset and the first scene position as the second scene position.

9. The method according to claim 3, wherein the moving a camera lens comprises:
obtaining lens attribute information, the lens attribute information indicating at least one of a moving speed and a moving manner of the camera lens; and
moving the camera lens according to the lens attribute information.

10. The method according to claim 1, wherein the displaying the controlled virtual object at the target position of the terminal screen in response to that the controlled virtual object belongs to the first camp comprises:
obtaining a target distance when the controlled virtual object belongs to the first camp, the target distance being a distance between a current scene position of the controlled virtual object and an initial position corresponding to the first camp; and
displaying the controlled virtual object at the target position of the terminal screen in response to the target distance being greater than a distance threshold.

11. The method according to claim 1, wherein the displaying the controlled virtual object at the target position of the terminal screen in response to that the controlled virtual object belongs to the first camp comprises:
obtaining a target duration when the controlled virtual object belongs to the first camp, the target duration being a duration in which the controlled virtual object is generated; and
displaying the controlled virtual object at the target position of the terminal screen in response to the target duration being greater than a duration threshold.

12. An apparatus for displaying a virtual scene, comprising a memory and a processor coupled to the memory, the processor being configured to:
display a virtual scene image of a multiplayer online battle arena (MOBA) game on a terminal screen of the mobile terminal, the virtual scene image comprising a controlled virtual object in a virtual scene, the controlled virtual object being a virtual object currently controlled by a terminal, and the MOBA game comprising a first camp based at an upper right corner of the virtual scene and a second camp based at a lower left corner of the virtual scene;
display the controlled virtual object at a central position of the terminal screen in response to that the controlled virtual object belongs to the second camp; and
display the controlled virtual object at a target position of the terminal screen in response to that the controlled virtual object belongs to the first camp, the target position being shifted to an upper right position relative to the central position of the terminal screen.

13. The apparatus according to claim 12, wherein the processor is further configured to:
obtain a target offset and a first scene position of the controlled virtual object in the virtual scene when the controlled virtual object belongs to the first camp, the target offset being used for adjusting a position of the controlled virtual object displayed on the terminal screen;
determine a second scene position according to the target offset and the first scene position; and
move a camera lens, wherein a lens projection point is moved to the second scene position, and the controlled virtual object is displayed at the target position of the terminal screen, the camera lens being used for photographing the virtual scene to obtain the virtual scene image displayed on the terminal screen, the lens projection point being a scene position corresponding to the camera lens in the virtual scene.

14. The apparatus according to claim 13, wherein the processor is further configured to obtain the first scene position of the controlled virtual object in the virtual scene when the controlled virtual object belongs to the first camp; and obtain the target offset according to a scene region to which the first scene position belongs, the target offset being an offset corresponding to the scene region.

15. The apparatus according to claim 13, wherein the processor is further configured to perform:
obtaining the first scene position of the controlled virtual object in the virtual scene when the controlled virtual object belongs to the first camp;
obtaining a third scene position of a target virtual object meeting a target condition, the target virtual object belonging to the second camp; and
determining the target offset according to the first scene position and the third scene position.

16. The apparatus according to claim 15, wherein the target condition comprises at least one of:
a distance from the controlled virtual object is less than a first distance;
virtual hit points are less than or equal to a hit point threshold; and
a latest attack by the controlled virtual object has been received.

17. The apparatus according to claim 15, wherein the obtaining a third scene position of a target virtual object meeting a target condition comprises:
- obtaining at least one virtual object belonging to the second camp within a target range centered on the first scene position;
- determining a virtual object meeting the target condition in the at least one virtual object as the target virtual object; and
- obtaining the third scene position of the target virtual object.

18. The apparatus according to claim 13, wherein the processor is further configured to:
- determine a sum of the target offset and the first scene position as the second scene position.

19. The apparatus to claim 12, wherein the processor is further configured to:
- display an operation control in a lower left part of the terminal screen;
- wherein the virtual object is controlled in response to a user touch operation on the operation control.

20. A non-transitory storage medium, configured to store at least one computer program, the at least one computer program, when being executed by a processor of a mobile terminal, causing the processor to perform:
- displaying a virtual scene image of a multiplayer online battle arena (MOBA) game on a terminal screen of the mobile terminal, the virtual scene image comprising a controlled virtual object in a virtual scene, the controlled virtual object being a virtual object currently controlled by the terminal, and the MOBA game comprising a first camp based at an upper right corner of the virtual scene and a second camp based at a lower left corner of the virtual scene;
- displaying the controlled virtual object at a central position of the terminal screen in response to that the controlled virtual object belongs to the second camp; and
- displaying the controlled virtual object at a target position of the terminal screen in response to that the controlled virtual object belongs to the first camp, the target position being shifted to an upper right position relative to the central position of the terminal screen.

* * * * *